United States Patent [19]

Stahl

[11] Patent Number: 4,499,800
[45] Date of Patent: Feb. 19, 1985

[54] TOOL HOLDER CLAMPING MEANS

[75] Inventor: Gunther R. Stahl, Canoga Park, Calif.

[73] Assignee: General Electric Company, Detroit, Mich.

[21] Appl. No.: 481,548

[22] Filed: Apr. 4, 1983

[51] Int. Cl.³ .................. B23B 29/00; B23B 31/00; B23B 5/22; B23B 5/34
[52] U.S. Cl. ..................... 82/36 R; 409/233; 408/239 R; 279/1 B; 279/75
[58] Field of Search ............... 82/36 R, 37; 409/233; 408/239 A, 239 R; 279/1 B, 75; 29/568

[56] References Cited

U.S. PATENT DOCUMENTS 3,254,567 6/1966 Daugherty ..................... 409/233
3,851,562 12/1974 Tomita et al. ................. 409/233

FOREIGN PATENT DOCUMENTS 776799 12/1980 U.S.S.R. ....................... 409/233

Primary Examiner—Francis S. Husar
Assistant Examiner—William E. Terrell
Attorney, Agent, or Firm—James J. Lichiello; Arthur E. Bahr; Ernest F. Chapman

[57] ABSTRACT

A tool holder clamping and unclamping device utilizes a special combination of a Belleville spring biased bolt threading device to actuate a ball detent mechanism to lock a tool holder in the device.

3 Claims, 1 Drawing Figure

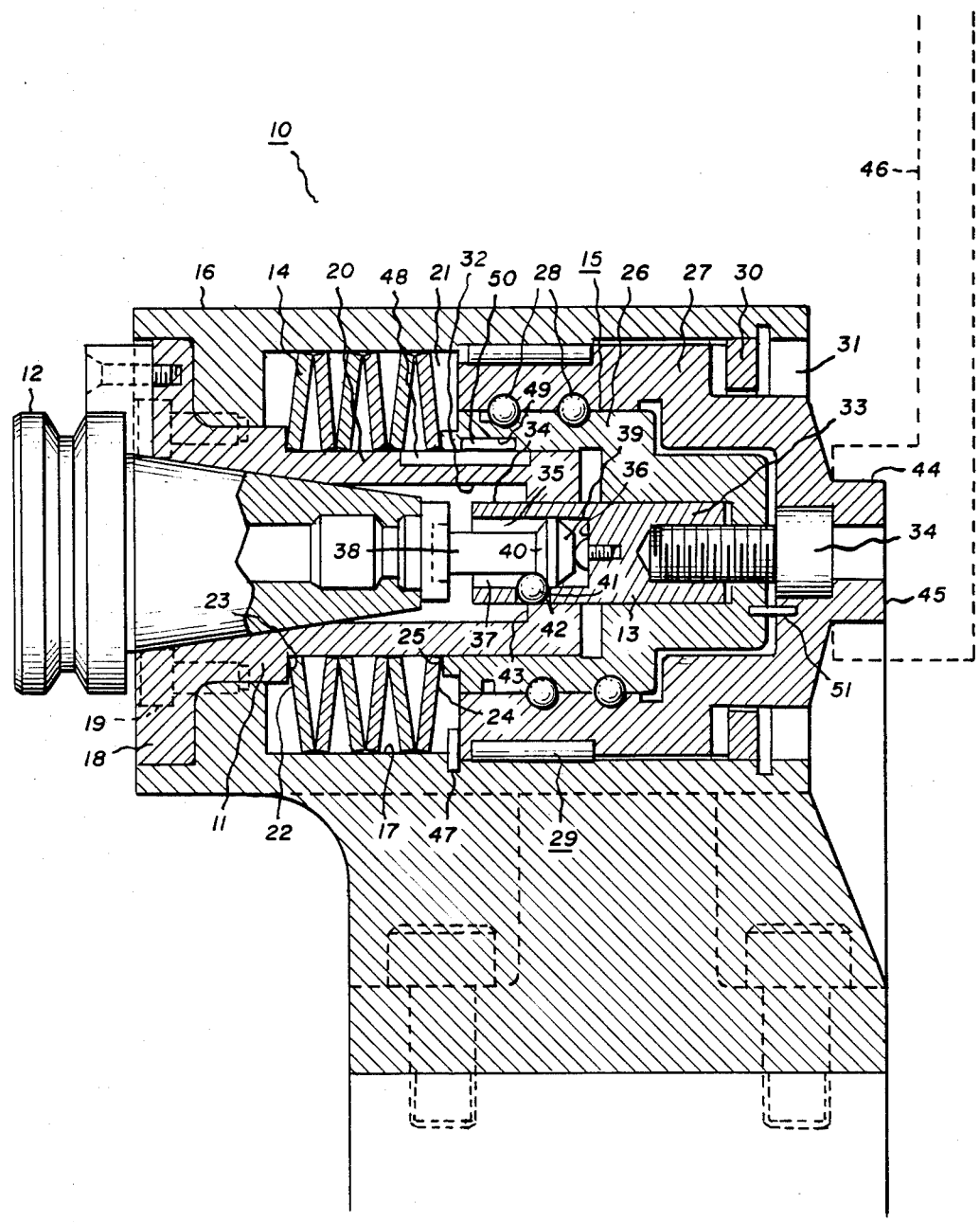

TOOL HOLDER CLAMPING MEANS

This invention relates to machine tools and more specifically to a tool mounting means or post adapted to more effectively releasably secure a metal cutting tool holder therein.

Machine tools adpated for metal working operations such as metal cutting, whether they be in the general form of a milling machine or a lathe type turning machine, include some form of a tool post mounting means. The tool post mounting means is adapted to receive and retain a tool holder therein, which generally comprises a tapered hollow shank member adapted to receive therein a metal cutting tool.

The replacement of a tool holder in a post is ordinarily a manual operation, time consuming, laborious, and somewhat imprecise by requiring certain adjustments after replacement. If the replacement operation is automatic or semi automatic, the mechanical strength requirements of the tool holding mechanism lead to the need for complex and powerful changing mechanisms usually based on hydraulic principles, especially to unclamp the tool holder. It is desirable to have a quick release mechanism which is not dependent on complex equipment and large forces, and lends itself to manual control as well as to light forces of more diminuative and sophisticated controls.

SUMMARY OF THE INVENTION

A clamping and unclamping mechanism of the present invention includes a combination of a ball thread device operative to operate a Bellville spring system which, at the same time, operates a detent mechanism to engage and disengage a tool holder. This mechanism operates with minimum force and minimum locking and unlocking motion of the mechanism.

THE DRAWINGS

This invention will be better understood when taken in connection with the following specification and drawings in which:

FIG. 1 is a side elevational and cross sectional view of a preferred embodiment of this invention.

DESCRIPTION OF PREFERRED EMBODIMENT

In one preferred embodiment of this invention, as illustrated in FIG. 1, a post means 10 contains a tapered insert 11 therein which is adapted to receive a tapered tool holder 12. A coaxially spaced ball detent device 13 locks the tool holder into the insert 11. Insert 11 has a plurality of coaxial Belleville springs 14 concentrically positioned on its cylindrical outer surface and biasing a ball thread device 15 to cause the detent 13 to lock the tool holder 12 in insert 11. The ball thread device 13 is activated to overcome the spring bias and cause the ball detent device 13 to unlock or unclamp the tool holder from the insert.

More specifically, post means 10 includes a sturdy heavy base or housing member 16 which is adapted to be tightly secured to a machine tool, for example, by means of machine screws. Housing 16 includes a bore 17 in which the operative mechanisms of this invention are disposed to releasably secure a tool holder 12 therein. Positioned in the bore 17 is the insert 11 which comprises a cylindrical face or flange part 18 securely fastened to housing 16 by screws 19 shown in phantom and a cylindrical extension 20 projecting into bore 17 and defining therewith an annular space 21. Within annular space 21 and concentric with extension 20 is a plurality of Belleville washers or springs 13, in this case three sets of springs. One cylindrical edge 22 of these Belleville springs bears against the cylindrical edge 23 of flange 18. The other cylindrical edge 24 of the springs 13 bears against a cylindrical edge 25 of an inner race 26 of the ball thread device 14.

The ball thread device 15 includes a generally cup shaped inner race 26 and nestled with but spaced from a generally cup shaped outer race 27. These races have complementary thread grooves on their adjustment surfaces to accommodate a plurality of balls 28 which permit the inner race to threadedly rotate within the outer race. The outer race rests within bore 17 in rotary relationship to the housing 15 but is prevented from any forward axial motion in bore 17 primarily by means of the springs 14 and a roller bearing assembly 19 and rearwardly by means of a thrust bearing 30 in end plate 31.

Positioned centrally with a bore 32 of inner race 26 is a tool holder 12 locking detent mechanism 13. Detent mechanism 13 comprises a coupling member 33 which is coaxially positioned within inner race 26 and is securely fastened to the back wall of inner race 26 by means of machine screw 34. The portion of coupling member 33 facing the rear of tool holder 12 includes a hollow coaxial cylindrical wall 34 defining a chamber 35. The rearward portion of the tool holder 12 also includes a hollow cylindrical wall 36 defining a chamber 37 which is coaxial with coupling chamber 35. A detent knob member 38 which is securely fastened to tool holder 12 extends into chamber 35 to engage a detent mechanism 13 and is Knob member 38 is adapted to project coaxially from tool holder 12 into chamber 35 to be coaxially, slidably engaged therein. The end of the detent knob member 38 in the coupling 33 has an enlarged tapered head 39 of a common detent design to provide a tapered shoulder 40. A detent ball 41 resides within an aperture 42 in the cylindrical wall 34 of space 35. The diameter of ball 41 is larger than the thickness of cylindrical wall 34 and thus projects above and below wall 34. Above the wall 34, the detent ball 41 nestles behind shoulder 40 while engaging the forward wall of aperture 42 thus preventing any axial forward movement of the tool holder 12 out of the insert 11. The detent ball 41 is retained in its engagement because a step projection 43 at the end of insert 11 underlies the aperture 42. While only one detent ball is illustrated, more than one is usually employed. In the present invention three balls 41 and respective apertures 42 are arranged in equidistant peripheral relationship. A cutting tool with its insert cutter may be affixed to tool holder 12 for a metal cutting operation. When, for various reasons, a cutting tool needs replacement the tool holder 12 complete with a cutting tool therein and detent knob member 38, may be expeditiously removed from the housing 15 (or insert 11) as a unit.

The operation of this clamping or locking device 10 is as follows. The outer race 26 of the ball thread 14 includes a concentric drive means 44 which, in this case, is a hexagonal projection 45 which is adapted to be rotated by means of handle 46 in phantom. Alternatively, drive means 44 may be a suitable connector for electric motor or other power source drive means. In FIG. 1, as illustrated, and looking from right to left, a counter clockwise motion of the handle 43 causes the outer race 27 to turn on the ball thread 28. Since the outer race 27 is axially fixed at the back end by the thrust bearing 30 and at the forward end by a lock ring 47, the balls 28 drive the inner race 26 axially so that its edge 25 begins to compress the Belleville springs at their edge 24. At the same time the coupling member 33 also begins to move axially to the left until detent aperture 41 moves away from the step projection 43 and the ball 42 drops away from the knob detent shoulder 40. The ball 42 diameter is correlated to the diameter of shoulder 40 and the inside diameter of the insert chamber 37 so that the ball remains within its aperture but is now at or below the inside edge of wall 34. At this point, the tool holder 12 may be readily withdrawn from the insert 11 and replaced.

In the replacement operation, the tool holder 12 is placed in the insert 11 and the detent knob member 38 moves into chamber 35 and beyond the detent ball 41. The handle 46 is now turned clockwise, assisted by the large forces in the Belleville springs 14. Clockwise rotation of the outer race causes the detent coupler 33 to move axially to the right until ball 41 rides up on step projection 43 and engages detent shoulder 40. Again, the taper fit of the insert 11 and tool holder 12 are correlated to the axial motion of the inner race 26 so that the tool holder 12 is firmly in place before the total length of axial travel of the inner race 26 is reached. The entire mechanism is heavily biased in the direction of tool locking by the Belleville springs which have high load/low deflection characteristics. However, the force required to unlock the device is relatively small because the ball thread unit 15 is very efficient in this operation. The necessary axial travel length of the inner race 26 is very short with balls 42 being about ¼ inch diameter.

In order to prevent any rotation of the inner race 26, the outer surface of insert 11 contains a slot 48 with an opposite comparable slot 49 in inner race 26. A loose fitting key 50 in these slots prevent such rotation. Additionally, a pin and slot combination 51 is utilized to prevent rotation of the parts, such as coupler 33 and the inner race 26, when the cap screw 34 is lightened.

Although the present invention has been described with reference to the foregoing specification, many modifications, combinations and variations of the invention will be apparent to those skilled in the art in light of the above teachings. It is therefore understood that changes may be made to the particular embodiments of the invention which are within the full intended scope of the invention as defined by the following claims.

I claim:

1. A tool holder locking means comprising in combination:
    (a) a housing adapted to be securely fixed to a machine tool and having a bore therein;
    (b) a hollow tapered tool holder insert in said bore for receiving a tool holder, said insert having a face end abutting said housing and having a hollow cylindrical projection positioned concentrically in said bore and defining an annular space therebetween;
    (c) a ball thread device comprising inner and outer nesting cup shaped races positioned concentrically in said bore adjacent said insert and with the outer race constrained from axial motion, said inner and outer races having complementary thread grooves on their adjacent surfaces having a plurality of drive balls therein whereby rotation of said outer race drives said inner race axially;
    (d) a hollow cylindrical coupling member affixed to said inner race and extending into the hollow cylindrical projection of said insert in coaxial relationship, said coupling member having means for axial reciprocating motion therein, said coupling member having a transverse aperture therein adjacent its inner end, a ball means loosely fitting in said aperture and adapted to occupy a first low position where the ball means rests on the bore of the insert while remaining in said aperture, and to occupy a second elevated position by means of a step shoulder on the end of said insert which underlies said aperture when the coupler is moved axially in one position;
    (e) a detent member affixed to said insert and coaxially projecting into said coupling member and engaging said ball means to be retained thereby;
    (f) spring means in said housing bore and coaxially positioned in said annular space between said insert projection and said housing bore, said spring means engaging said insert at one end and engaging said inner race at the outer end; and (g) drive means on said outer race and adapted to rotate said outer race so that said inner race moves axially to compress said spring means while at the same time moving said coupling member axially so that said detent ball drops in its aperture to permit withdrawal of said detent from said coupling means and said tool holder from said insert.

2. The invention as recited in claim 1 wherein said spring means is a set of Belleville springs.

3. The invention as recited in claim 2 wherein said drive means comprises a handle attachment coaxially projecting from said outer race.

* * * * *